Aug. 24, 1926.
H. NYQUIST
MEASURING TRANSMISSION DELAY
Filed Sept. 1, 1925
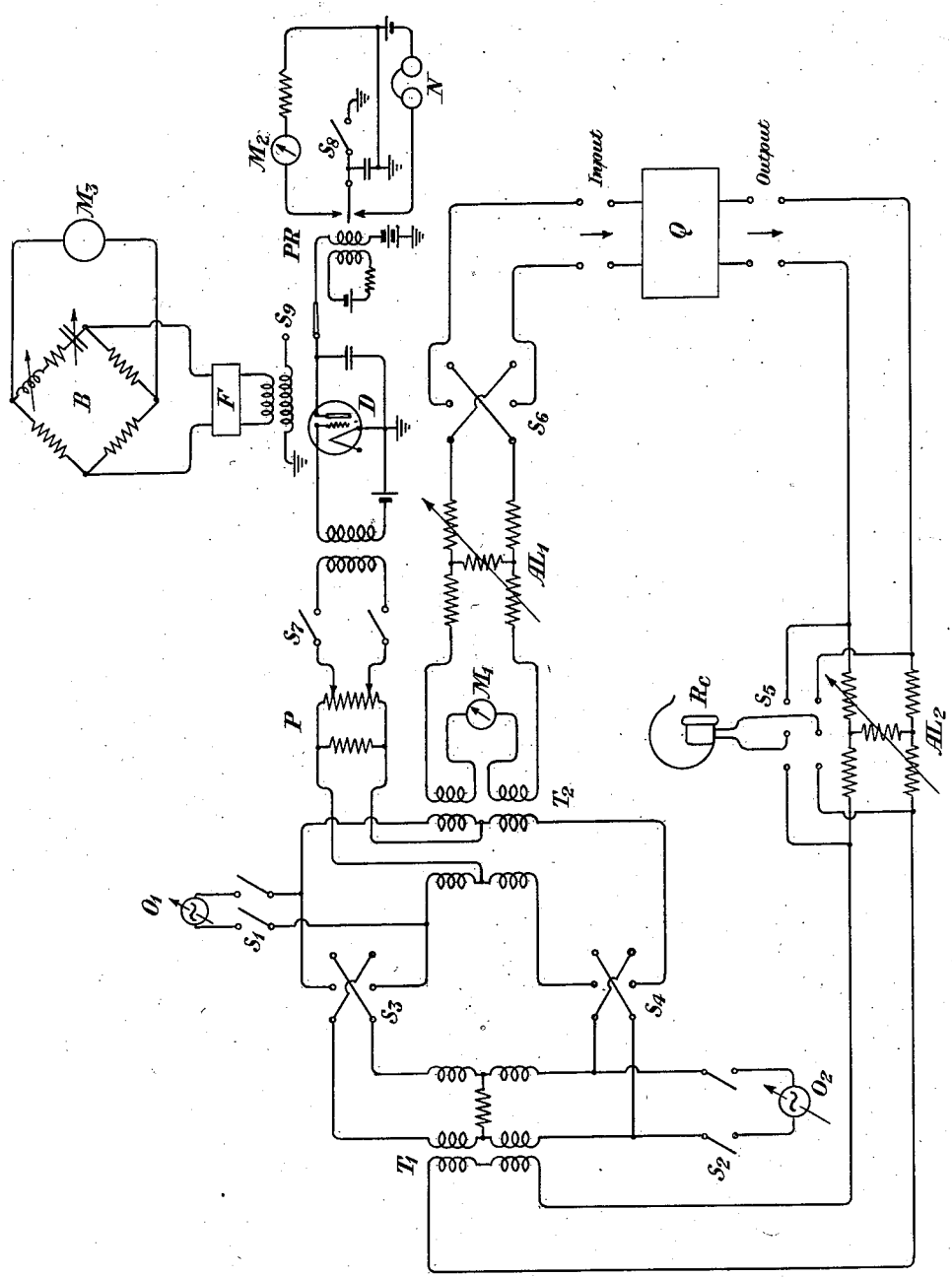
INVENTOR
*H. Nyquist*
BY
ATTORNEY Patented Aug. 24, 1926.

1,596,941

UNITED STATES PATENT OFFICE.

HARRY NYQUIST, OF MILLBURN, NEW JERSEY, ASSIGNOR TO AMERICAN TELEPHONE AND TELEGRAPH COMPANY, A CORPORATION OF NEW YORK.

MEASURING TRANSMISSION DELAY.

Application filed September 1, 1925. Serial No. 53,942.

It is an object of my invention to provide a method and appropriate apparatus for measuring the delay in transmission of an alternating current through a given line or through any transducer. Another object of my invention is to provide for measuring transmission delay at various frequencies so that a delay-frequency characteristic can be plotted from the data obtained. Another object of my invention relates to the use of an oscillator adjustable as to frequency, and a receiver connected therewith by two paths, one comprising a transducer whose delay is to be measured; by reversing the connections in one path and varying the frequency of the oscillator, two consecutive adjustments can be found giving a null effect in the receiver and the difference of delay between these two adjustments will be 180°. From this datum and from the known change in frequency of the oscillator the delay can readily be computed. These objects and other objects of my invention will become apparent on consideration of an example of practice according to the invention which I have chosen for disclosure in the following specification, taken with the accompanying drawing. It will be understood that the following description relates to this example of the invention and that the invention will be defined in the appended claims.

Referring to the drawing, this is a diagrammatic representation of circuits and associated apparatus that may be employed in the practice of my invention.

By closing the switch $S_1$ the oscillator $O_1$ will be operatively connected through the transformer $T_2$, artificial line $AL_1$, switch $S_6$ and transducer Q to the receiver Rc. Also the oscillator $O_2$ can be connected in the same way through the switches $S_2$ and $S_4$, and each oscillator $O_1$ or $O_2$ can be connected through the transformer $T_1$ more directly with the receiver Rc. By means of the switch $S_5$ the artificial line $AL_2$ can be included in either of these two paths from the oscillators to the receiver Rc.

The currents from the oscillators $O_1$ and $O_2$ or either of them may also be taken through the potentiometer P and switch $S_7$ to a detector D. Further details of structure will be pointed out in connection with the following description of the use of the apparatus shown in the drawing.

Q is a transmission line or any transducer for which it is desired to determine the delay of transmission at a particular frequency or at various frequencies. It is connected in the system as shown and the oscillator $O_1$ is adjusted to give a current of a suitable frequency, say about 1,000 cycles per second, if the investigation has reference to the voice frequency range. Switches $S_1$ and $S_3$ are closed and $S_2$ and $S_4$ are left open. Switch $S_5$ is thrown to the right or the left according as the transducer Q gives a net loss or a net gain.

The frequency of the oscillator $O_1$ is then carefully adjusted and the artificial line $AL_2$ is also adjusted so as to get a null effect in the receiver Rc. At this adjustment, it means that currents arriving at the receiver from the oscillator $O_1$ over the two paths are of equal intensity and 180° (or an odd multiple thereof) out of phase. The two paths mentioned are one of them through the transformer $T_2$, artificial line $AL_1$ and transducer Q, and the other path is through the transformer $T_1$.

Next, close the switch $S_2$ and reverse the switch $S_5$; thus the receiver Rc will get sound from both oscillators $O_1$ and $O_2$. Adjust the oscillator $O_2$ until its frequency comes somewhere near that of the oscillator $O_1$ and beats will be noticed in the receiver Rc. Further adjust the oscillator $O_2$ to the no-beat adjustment; this means that the two oscillators $O_1$ and $O_2$ now have the same frequency. Call this frequency $f_1$; its numerical value is not as yet known.

Now restore the switch $S_5$ to its former position and open the switch $S_1$. It is apparent that there should be no sound in the receiver Rc, and this will be the case if the transformers have been properly poled; however, if this is not the case, and if a loud sound is heard, it may be overcome by throwing the reversing switch $S_4$.

Now throw the reversing switch $S_6$; whereas the currents to the receiver Rc over the two paths were formerly in phase opposition in their effect, they will now be in phase reinforcement and a loud tone will be heard in the receiver Rc. Slowly adjust the oscillator $O_2$ in frequency until this tone disappears in the receiver Rc. This will mean that with the phase angle of the apparatus Q a function of frequency, the frequency has been changed enough to shift the phase angle 180°. Call this second frequency $f_2$. In order to get the zero effect at this frequency it may be necessary slightly to readjust the artificial line $AL_2$.

We now have the two oscillators $O_1$ and $O_2$ adjusted at respective frequencies $f_1$ and $f_2$ such that the transmission delay through Q differs by 180° for these two cases. We next are to determine the magnitude of this frequency difference.

With the switches $S_1$, $S_2$, $S_7$ and $S_8$ closed, currents of these two frequencies will be superposed in the input of the detector D. The polarized relay PR in the output circuit of this detector D will operate at each beat between the two frequencies $f_1$ and $f_2$, causing the operation of the sounder N. This sounder will give a rough idea of the number of beats per second and will thereby indicate whether or not the milliammeter $M_2$ is liable to injury when it is thrown into the circuit. Having determined this, open switch $S_8$. Thereupon the operation of the polar relay PR will cause a deflection of the milliammeter $M_2$. This deflection, together with a calibration curve, may be used to give the count of the beats per second. The number of beats per second will be equal to $f_2 - f_1$.

The formula $T = d\theta/d\omega$ has been found to hold with sufficient accuracy. In this formula where T is the delay in transmission, $\theta$ is the phase displacement in radian measure and $\omega = 2\pi$ times the frequency. In other words, the delay equals the increment of phase angle divided by the increment of periodicity. In the case under consideration the increment of phase angle is $\pi$, and the increment of periodicity is $2\pi(f_2-f_1)$ and their quotient is $T=1/[2(f_2-f_1)]$.

The foregoing formula gives the delay T at a frequency which can be taken as the mean of $f_1$ and $f_2$. The delay at other values of frequency can be obtained in a similar manner and thus a plot can be made of the delay as a function of frequency.

Instead of measuring the frequency difference $f_2-f_1$ by the beat method as here described, the measurement may be made by means of a bridge B. In this case the switch $S_9$ is shifted from the position shown in the drawing and the beat currents from the detector D go through the filter $f$ to the bridge B, three arms of which are resistances, but the fourth arm has an inductance and capacity in addition to a resistance. For any beat frequency this inductance and capacity may be adjusted to resonance, thus giving a null effect in the meter $M_3$. The inductance and capacity are calibrated so that from their adjustment the beat frequency can readily be determined.

I claim:

1. The method of measuring the delay of transmission through a given transducer at a certain frequency, which consists in reversing the current and changing the frequency enough to change the delay by a half period and getting the delay by means of the formula $T=1/[2(f_2-f_1)]$.

2. The method of measuring the delay in transmission through a given transducer at a certain frequency, which consists in adjusting to a frequency $f_1$ at which the phase of the input and output currents differs by an odd multiple of $\pi$, then reversing the connections and changing to the next frequency $f_2$ at which the difference between said currents is increased or decreased by $\pi$ and getting the delay by the formula $T=1/[2(f_2-f_1)]$.

3. The method of measuring the delay of transmission through a given transducer at a certain frequency, which consists in receiving the input and output currents in a common receiver and adjusting the frequency to zero tone in the receiver whereby the phase difference is known to be an odd multiple of $\pi$, then reversing one current to the receiver and changing the frequency to the next value giving zero tone, then getting the difference between these two frequencies and getting the delay by the formula $T=1/[2(f_2-f_1)]$.

4. Means to measure the delay through a transducer, comprising an oscillator adjustable as to frequency, a receiver for comparing the input and output current from the oscillator through the transducer and means to obtain the difference of frequency of the oscillator at two adjustments.

5. The method of ascertaining the delay in a transducer, which consists in varying the frequency of a source and determining the change of frequency that gives a half period change of phase shift through the transducer.

6. The method of measuring the delay of transmission through a given transducer at a certain frequency which consists in changing the frequency over a narrow range and noting the corresponding change of phase shift through the transducer and deducing the delay therefrom.

7. The method of measuring the delay of transmission through a given transducer at a certain frequency which consists in changing the frequency enough to change the phase shift by a definite easily ascertained angle, and from these data deducing the delay.

In testimony whereof, I have signed my name to this specification this 26th day of August, 1925.

HARRY NYQUIST.